United States Patent [19]

Dolla

[11] Patent Number: 5,531,135
[45] Date of Patent: Jul. 2, 1996

[54] PEDAL ARRANGEMENT FOR A MOTOR VEHICLE

[75] Inventor: Franz Dolla, Isenbüttel, Germany

[73] Assignee: Volkswagon AG, Wolfsburg, Germany

[21] Appl. No.: 236,996

[22] Filed: May 2, 1994

[30] Foreign Application Priority Data

Jun. 11, 1993 [DE] Germany .......................... 43 19 358.7

[51] Int. Cl.$^6$ ..................................................... G05G 1/14
[52] U.S. Cl. ................................................ 74/512; 74/560
[58] Field of Search ............................. 74/512, 514, 560, 74/513

[56] References Cited

U.S. PATENT DOCUMENTS

| | | | |
|---|---|---|---|
| 4,658,660 | 4/1987 | Parker | 74/512 X |
| 4,662,237 | 5/1987 | Kami et al. | 74/513 X |
| 4,672,860 | 6/1987 | Parker et al. | 74/560 X |
| 4,800,773 | 1/1989 | Nakamura et al. | 74/512 X |
| 5,233,882 | 8/1993 | Byram et al. | 74/514 |

FOREIGN PATENT DOCUMENTS

| | | | |
|---|---|---|---|
| 0333525 | 9/1989 | European Pat. Off. | 74/512 |
| 2841988 | 4/1980 | Germany | 74/512 |
| 3904616 | 8/1989 | Germany | 74/512 |
| 60-135329 | 7/1985 | Japan | 74/512 |
| 4-291407 | 10/1992 | Japan | 74/512 |
| 2255158 | 10/1992 | United Kingdom | 74/512 |

*Primary Examiner*—Vinh T. Luong
*Attorney, Agent, or Firm*—Brumbaugh, Graves, Donohue & Raymond

[57] ABSTRACT

A bulkhead separating an engine compartment from a driver compartment of a motor vehicle is provided with an intentional buckling zone. The buckling zone is arranged so that a frontal impact moves the bulkhead and a bearing mount for pedal levers in such a way that the pedal levers are moved away from the operator. In one embodiment the buckling zone is produced by weakening the bulkhead material by making it thinner or providing holes or tucks in the material. When the buckling zone buckles in a frontal collision the bearing mount pivots upwardly, moving the pedal levers away from the vehicle operator.

7 Claims, 3 Drawing Sheets ns a bearing# PEDAL ARRANGEMENT FOR A MOTOR VEHICLE

BACKGROUND OF THE INVENTION

This invention relates to pedal arrangements for motor vehicles in which pedals are supported from a bearing mount attached to the bulkhead.

A pedal arrangement in which pedals are supported from a bearing mount attached to the bulkhead is disclosed in German Offenlegungsschrift No. 39 04 616. This configuration is advantageous because, in the event of a frontal collision of the vehicle, the pedal levers projecting into the foot space of the passenger compartment are moved away from the operator of the vehicle by a rotary motion. This arrangement substantially reduces the risk of foot injury in motor vehicle accidents.

A similar principle using a different construction is disclosed in German Offenlegungsschrift No. 28 41 988. In that case, a subassembly containing a bearing mount and pedal levers is pivotally supported at its lower end by a nondeformable longitudinal support member of the vehicle rather than being fixed to a deformable front bulkhead of the vehicle body and is releasably retained in position at its upper end by tongues which engage an upper transverse member located behind the bulkhead. From the point of view of occupant safety, this arrangement is regarded as highly favorable, but this favorable arrangement is not achieved without substantial engineering expense.

SUMMARY OF THE INVENTION

Accordingly, it is an object of the present invention to provide a pedal arrangement for a motor vehicle which overcomes the disadvantages of the prior art.

Another object of the invention is to provide a pedal arrangement which responds to collision forces in an improved manner.

These and other objects of the invention are attained by providing a pedal arrangement having a pedal with a bearing mount supported from a bulkhead formed with a buckling zone which causes the bearing mount to move the pedal away from the vehicle operator upon impact resulting from a frontal collision.

Thus, according to the invention, a buckling zone is intentionally provided in the front bulkhead of the vehicle so that, in the event of a frontal impact affecting the bulkhead, the bearing mount holding the pedals is displaceable so as to move the pedal levers away from the operator. According to one embodiment, the buckling zone may be favorably located, for example, in a bulkhead recess which is ordinarily occupied by a power brake booster without any major modification of the existing vehicle design. In that case, especially good results may be obtained if the bearing mount displacement produced by dislocation of the front bulkhead is further assisted by action of the booster. Preferably, for this purpose, the booster and the bearing mount supporting the pedal linkage are joined to each other on opposite sides of the bulkhead, forming a rigid assembly. Following a frontal impact, the bulkhead buckling zone, which is preferably located above the booster, gives way and thus produces a rotary motion of the rigid assembly. If desired, simple struts may be used to support the pedal bearing mount rather than a bulkhead made of metal webs, thus ensuring an especially controlled rotation of the pedals.

BRIEF DESCRIPTION OF THE DRAWING

Further objects and advantages of the invention will be apparent upon reading the following description in conjunction with the accompanying drawings, in which.

DESCRIPTION OF PREFERRED EMBODIMENTS

Figure 1:
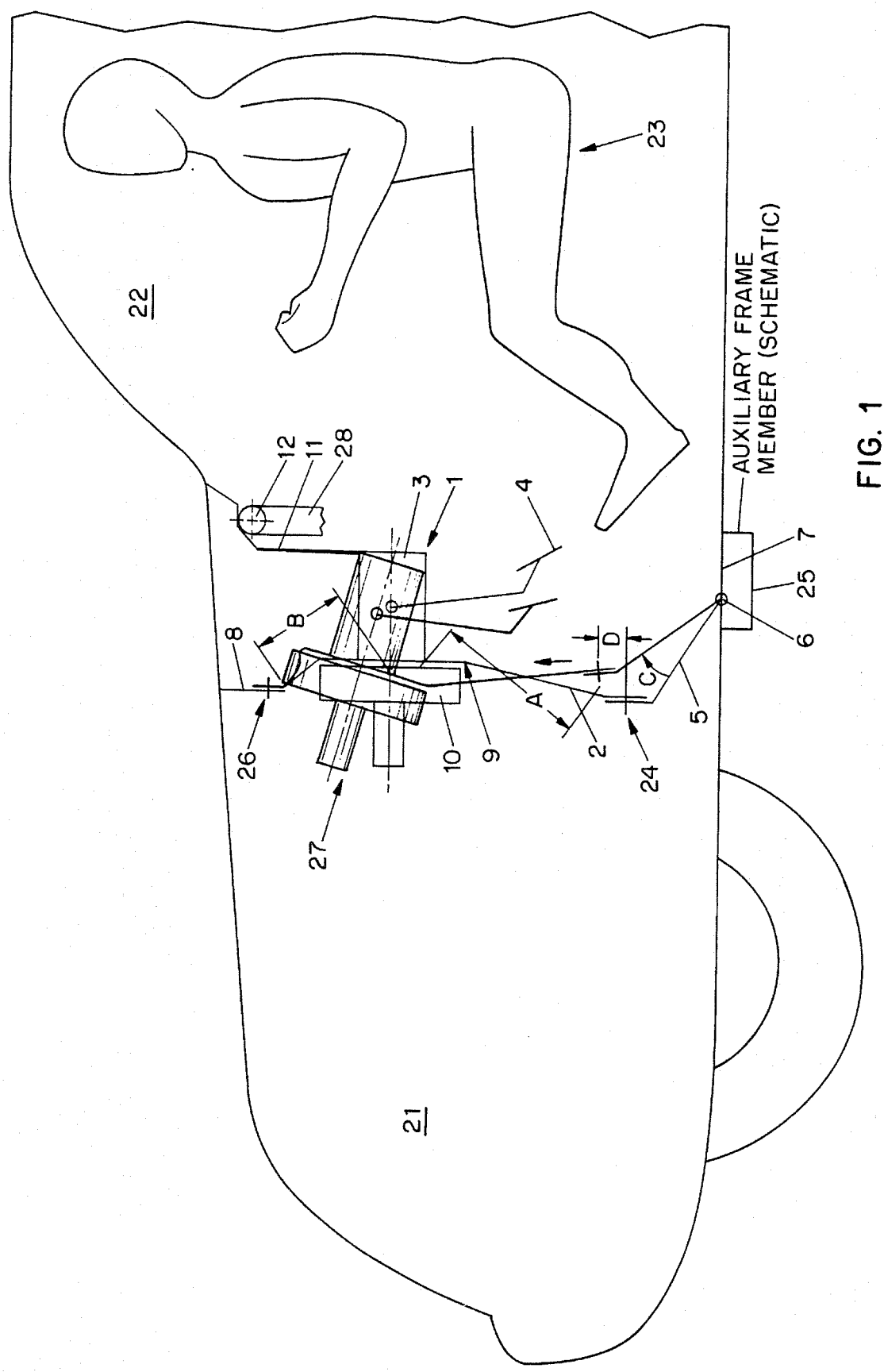
FIG. 1 illustrates schematically a portion of a motor vehicle containing a representative pedal arrangement in accordance with the invention.
Figure 1A:
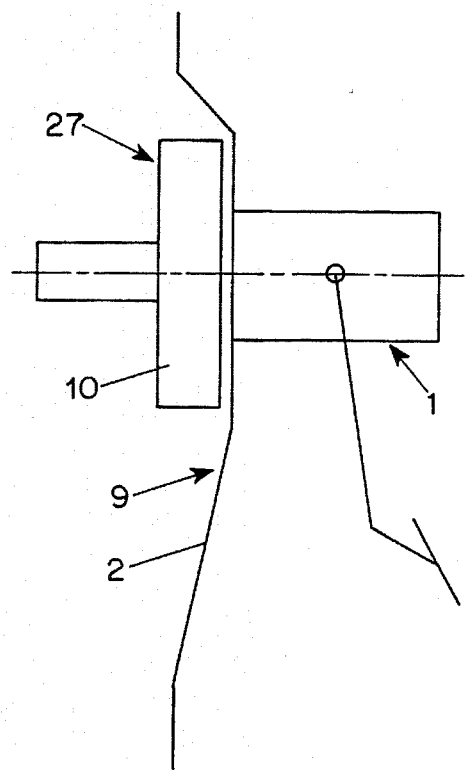
FIGS. 1(a)–1(e) illustrate modifications of the pedal arrangement shown in FIG. 1.

In the typical embodiment of the invention shown schematically in FIG. 1, a pedal arrangement 1 for a motor vehicle 20 having an engine compartment 21 and an operator compartment 22 for an operator 23 includes a bearing mount 3 attached to a bulkhead 2 and supporting foot pedals, only one of which, a brake pedal 4, is shown in FIG. 1. At its lower end, the bulkhead 2 is attached to a foot plate 5 by a screwed or welded connection 24, for example, and the foot plate 5 is, in turn, attached to a longitudinal support member 7 at a buckling point 6. An auxiliary frame member 25 may be connected to the longitudinal support member 7 in the region of the buckling point 6. At its upper end, the bulkhead 2 is attached to a transverse wall 8 by screws, welds 26 or the like. On the side of the bulkhead 2 facing the engine compartment 21, a power brake booster 10 is mounted in a bulkhead recess 9 and forms a substantially rigid unit 27 with the bearing mount 3 as shown in FIG. 1(a) by a bolted or overlapped connection. In the illustrated embodiment of the invention, a strut 11 supports the bearing mount 3 from a flexurally relatively rigid transverse member 12 which extends between the so-called A-columns 28 of the motor vehicle and is attached thereto.

Figure 1B:
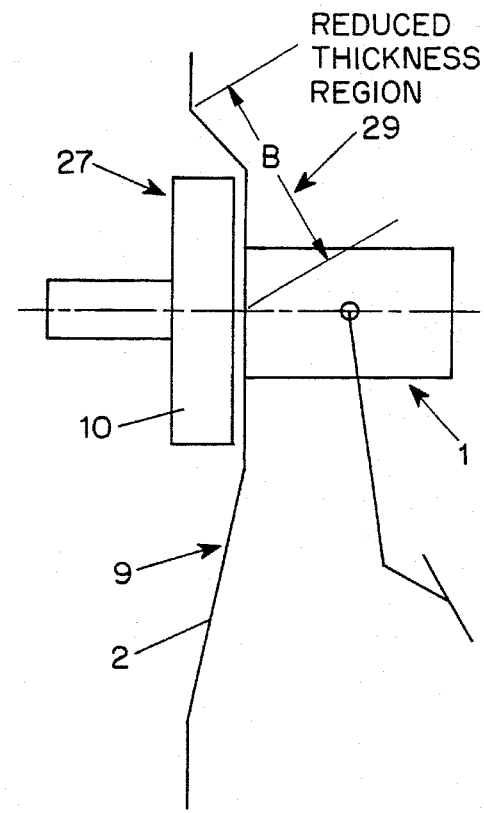
Figure 1C:
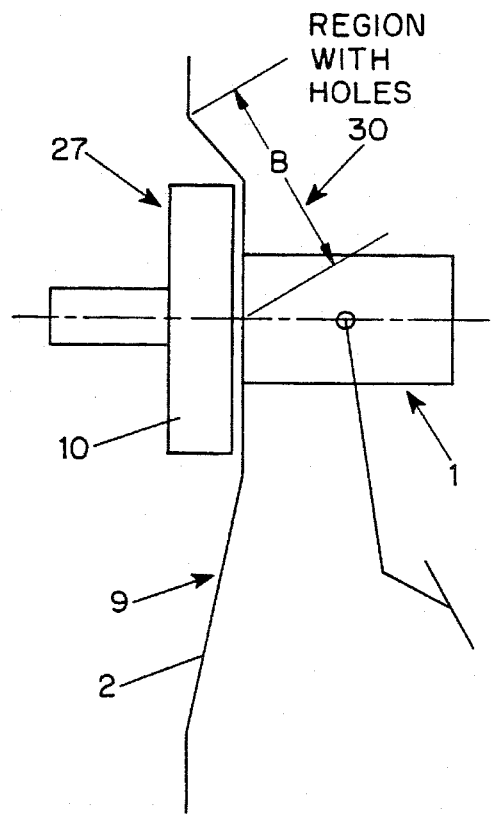
Figure 1D:
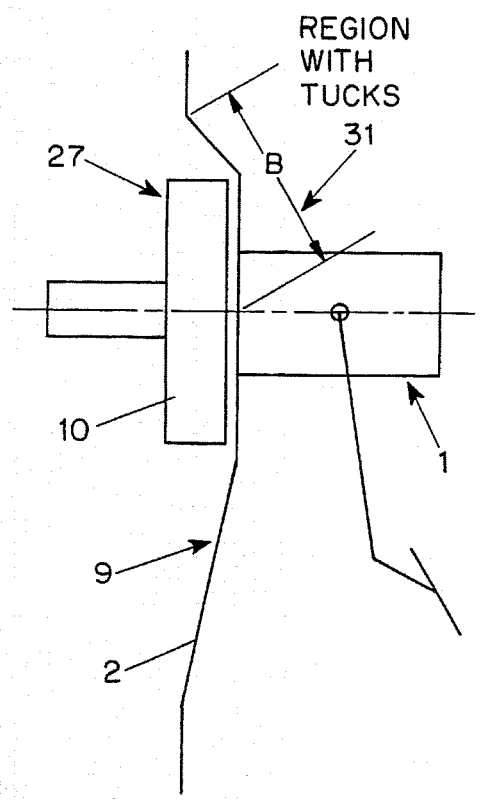
Figure 1E:
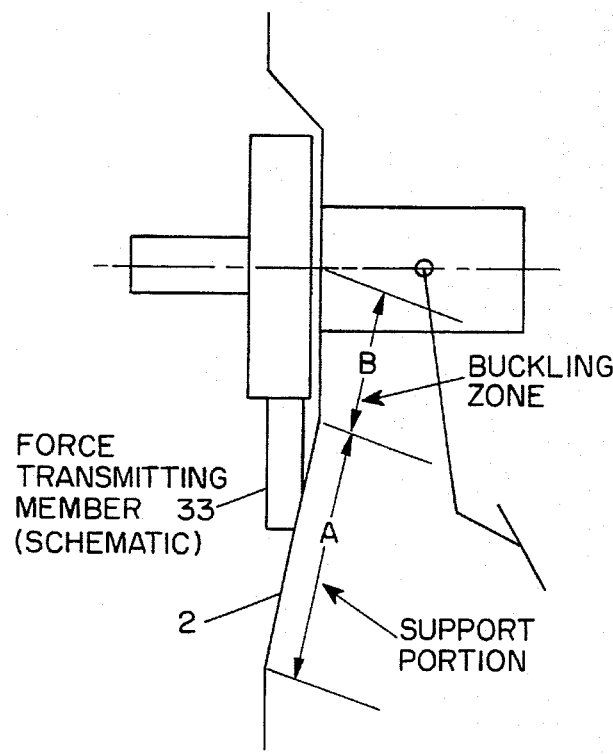

In a region of the support arrangement designated A in the drawing, the bulkhead 2 is of relatively rigid construction. The intentional buckling zone provided according to the invention is located in a region designated B in the drawing, and it may, for example, be produced by deliberate weakening of the bulkhead material, for example, by a reduction of the sheet metal thickness 29 as shown in FIG. 1(b), or by providing holes 30 or tucks 31 in the bulkhead material as shown in FIGS. 1(c) and 1(d), respectively.

As a result of an impact produced by a frontal collision, especially for vehicles with an auxiliary-frame design, the foot plate 5 may be pushed up about the buckling point 6, as indicated by the arrow C in FIG. 1, while the buckling point 6 remains substantially undisplaced. As a result, the bulkhead 2 is moved upwardly by a distance D. Consequently, deformation forces are transmitted upwardly through the relatively rigid zone A into the buckling zone B, which then gives way in accordance with the invention and thus leads to an upward displacement of the bearing mount 3 about the lower end of the strut 11.

As a result, the brake pedal 4 is moved from the initial position shown in light lines in the drawing into the retracted position shown in heavy lines in the drawing. From the drawing, it is evident that, even with an unavoidable intrusion of the bulkhead 2 into the passenger compartment, the foot pedals 4 are nevertheless moved away from the operator of the vehicle. The motion of the bulkhead 2, which is undesirable in principle, but is also unavoidable, is thus utilized advantageously to improve occupant safety in the footroom portion of the passenger compartment.

This positive effect may, if desired, be reinforced by positioning the power brake booster 10 so that the impact of the engine components present in the engine compartment upon the power brake booster 10, which projects forwardly into the engine compartment, assists the pivoting motion shown in the drawing.

It should also be noted that the pedal arrangement according to the invention is not limited to pedal linkages having suspended pedals. Depending upon the collision-generated forces in a given design, it is also possible for pedals extending upwardly from a bearing mount to be moved out of a zone in which they could be hazardous to the feet of occupants by suitable utilization of front bulkhead displacement.

The representative embodiment shown in the drawing is also remarkable in view of its easily-installed construction. The combination of the bulkhead 2, the pedal arrangement 1 and the power brake booster 10 may be completely preassembled as the unit 27 shown in FIG. 1(*a*) before being installed in the vehicle.

In another highly advantageous pedal arrangement according to the invention, which differs from the representative embodiment shown in the drawing, the buckling zone B is arranged below the bearing mount 3 as show in FIG. 1(*e*). Beneath the buckling zone, a support portion is formed in the bulkhead 2, which is connected by force-transmitting member 33 to the bottom of the bearing mount 3 so that, when the rigid portion A of the bulkhead 2, and hence the support portion, also is lifted, the bearing mount, being only loosely attached or even displaceably held, for example, by way of a sectional member or a linkage, is pivoted from below about the bottom end of the strut 11.

In either of the two modifications described above, the strut 11 may be eliminated if the transverse member 12 is located farther down in the vehicle and is connected to the bearing mount 3.

Although the invention has been described herein with reference to specific embodiments, many modifications and variations therein will readily occur to those skilled in the art. Accordingly, all such variations and modifications are included within the intended scope of the invention.

I claim:

1. A pedal arrangement for a motor vehicle having an engine compartment and an operator compartment comprising a bulkhead between the engine compartment and the operator compartment, a bearing mount fastened to the bulkhead, at least one pedal lever supported by the bearing mount, a flexurally rigid transverse member to which the bearing mount is attached, and a buckling zone in the bulkhead located in a region where the bearing mount is fastened to the bulkhead and arranged so that, in response to application of a force to the bulkhead resulting from a frontal impact, the bearing mount is displaced in a direction to move the pedal lever supported thereby away from an operator of the vehicle in the operator compartment.

2. A pedal arrangement according to claim 1 including a power brake booster mounted in a recess formed in the bulkhead.

3. A pedal arrangement according to claim 1 wherein the bulkhead, the bearing mount and the pedal lever form an assembly which is installed as a unit in the motor vehicle.

4. A pedal arrangement according to claim 1 wherein the buckling zone of the bulkhead is thinner than other portions of the bulkhead.

5. A pedal arrangement according to claim 1 wherein the buckling zone is formed by at least one opening in the bulkhead.

6. A pedal arrangement according to claim 1 wherein the buckling zone is formed by at least one tuck in the bulkhead.

7. A pedal arrangement according to claim 1 wherein the bearing mount is affixed to the bulkhead beneath the buckling zone, whereby the bearing mount may be acted upon by a force-transmitting member to produce a displacement of the pedal lever.

\* \* \* \* \*